Patented June 17, 1924.

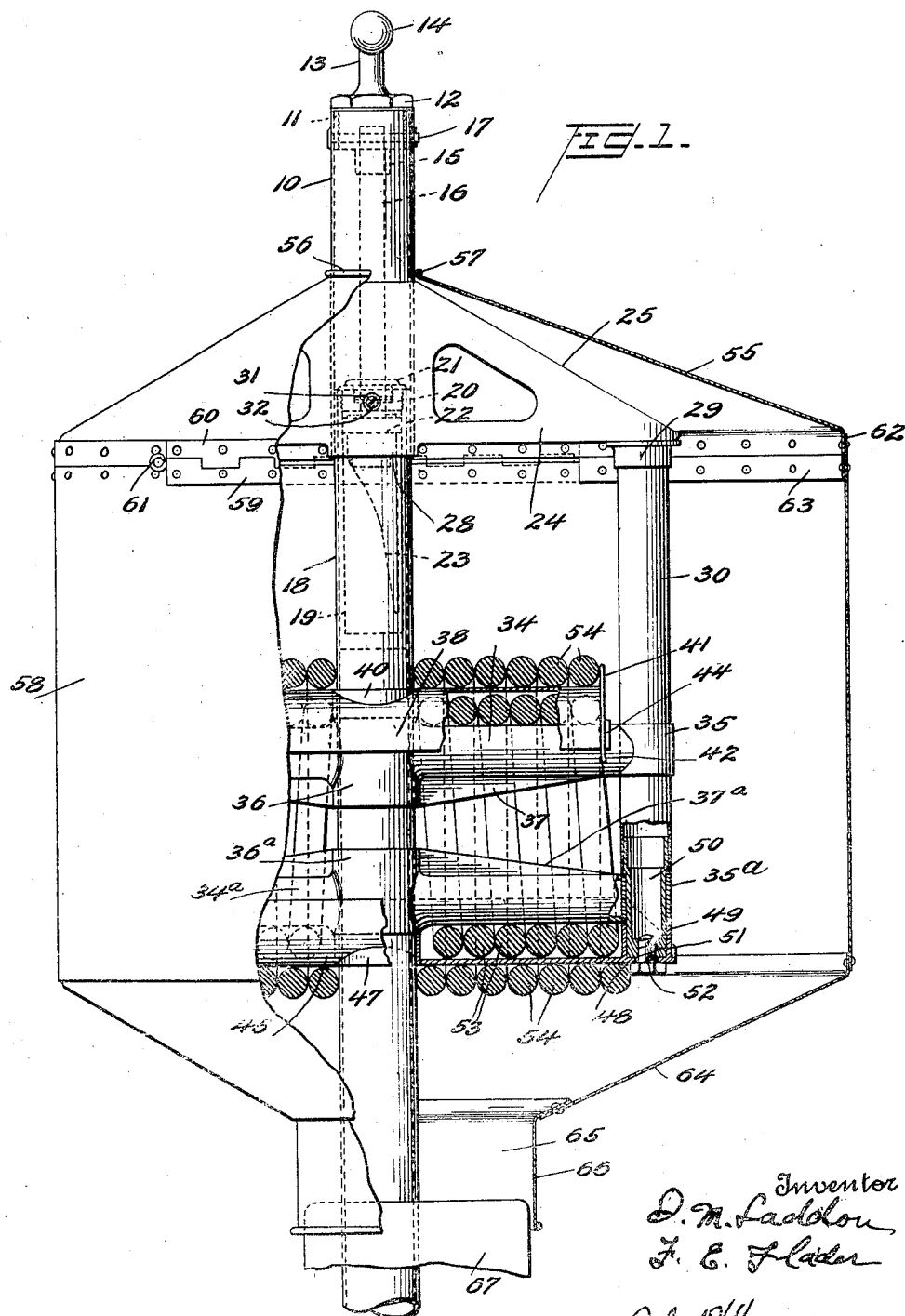

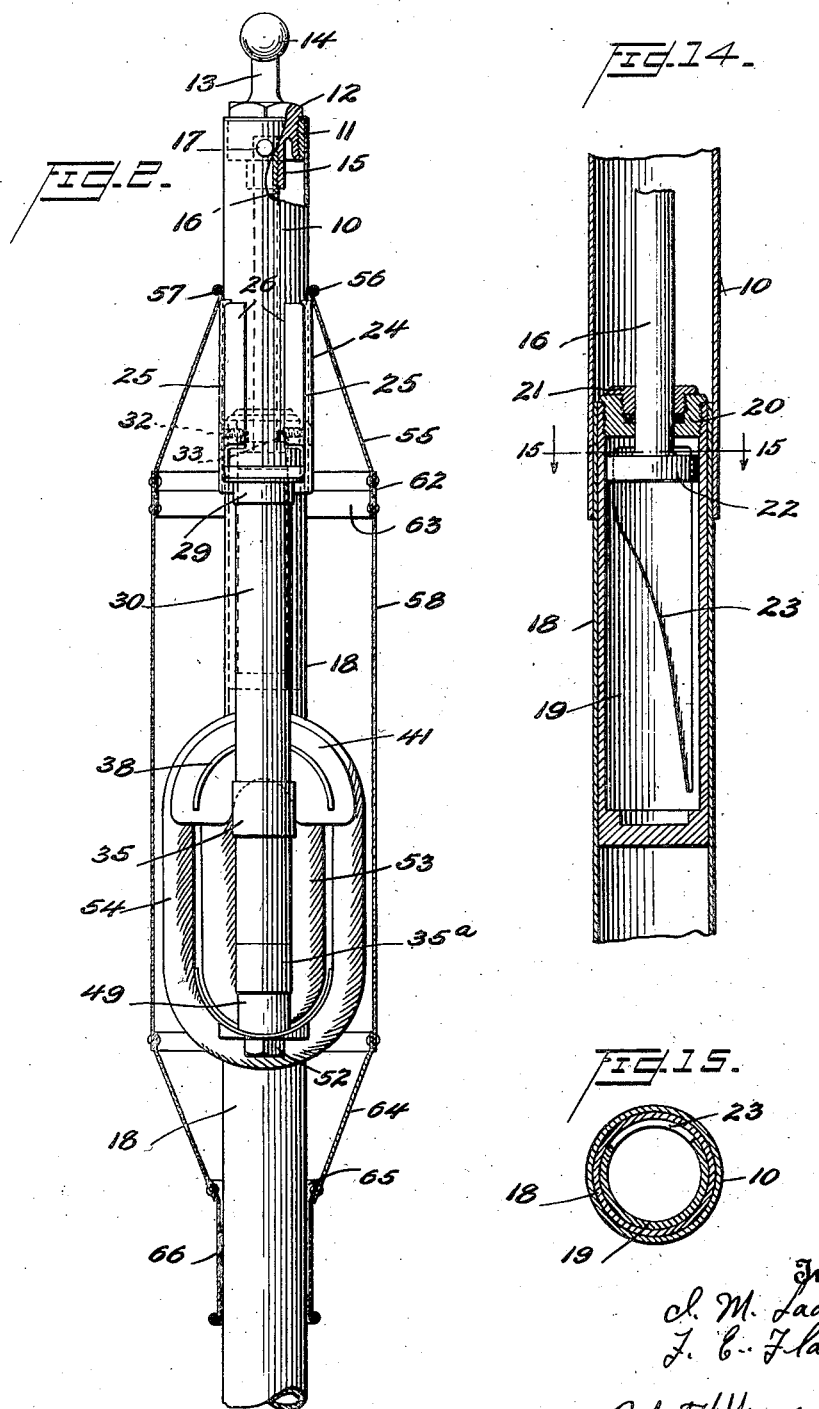

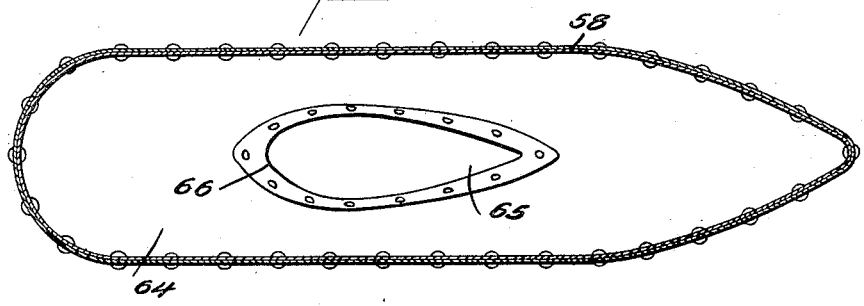
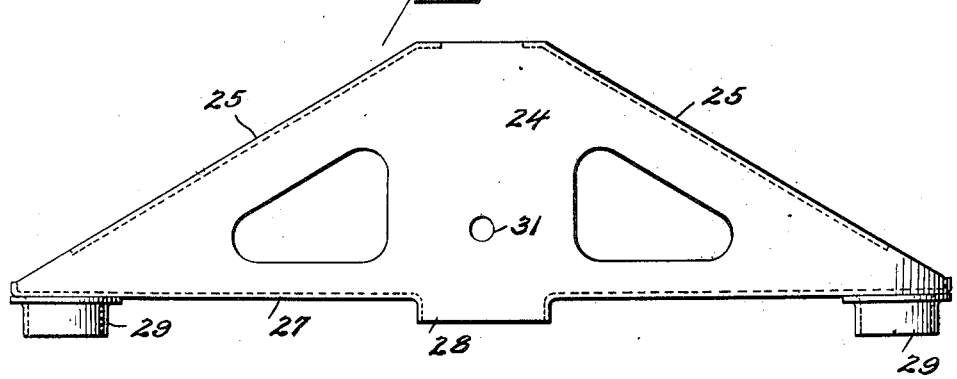
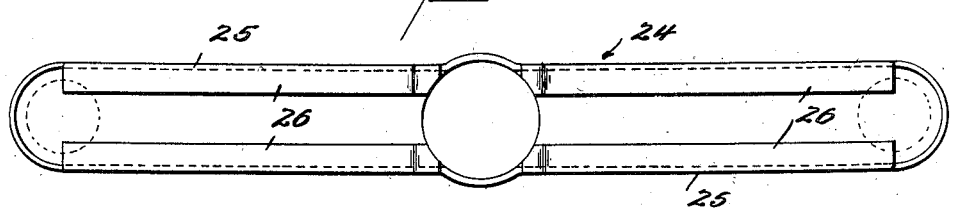
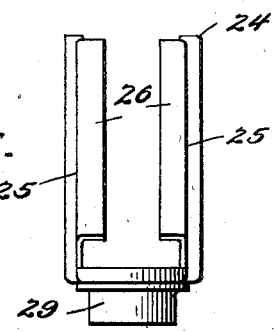

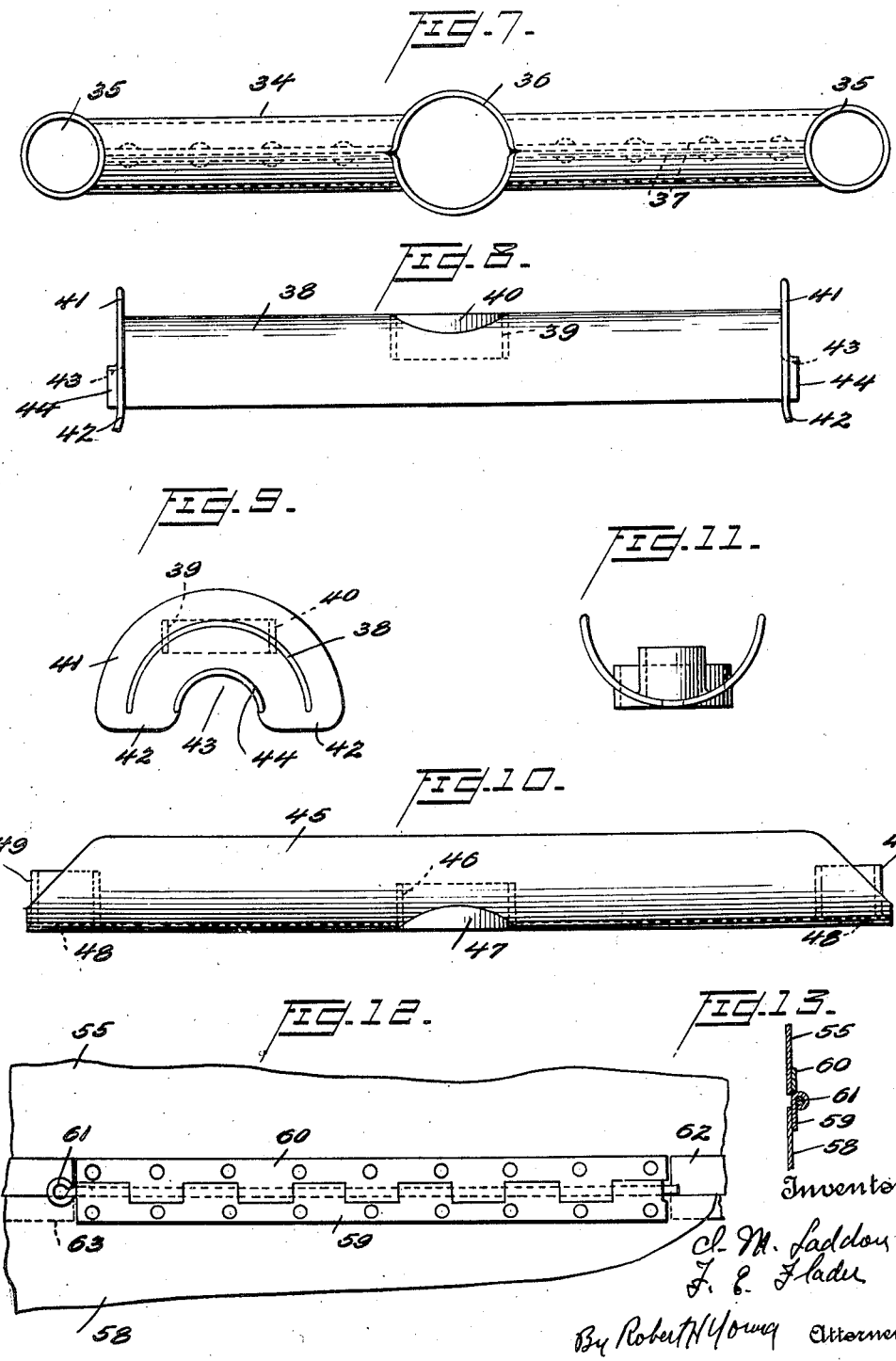

1,498,044

UNITED STATES PATENT OFFICE.

ISAAC M. LADDON AND FREDRIC E. FLADER, OF DAYTON, OHIO.

SHOCK ABSORBER FOR LANDING GEARS FOR AIRCRAFT.

Application filed March 9, 1922. Serial No. 542,433.

*To all whom it may concern:*

Be it known that we, ISAAC M. LADDON and FREDRICK E. FLADER, citizens of the United States, residing at Dayton, in the county of Montgomery and State of Ohio, have invented certain new and useful Improvements in Shock Absorber for Landing Gears for Aircraft, of which the following is a specification.

This invention relates to a landing gear for airplanes having shock absorbing mechanism incorporated in the structure thereof.

The shock absorbing mechanism, according to our invention, consists essentially of the combination structurally and functionally of a dash pot and elastic cords. The parts are so arranged that the dash pot absorbs the greater portion of the landing shock and the elastic cords return the shock absorbing mechanism to normal position.

The invention is fully described in the following specification, in connection with the accompanying drawings, in which—

Figure 1 is a side elevation of the landing gear with parts of the fairing broken away to disclose the shock absorbing mechanism, Figure 2 is an end view of the landing gear, the shock absorber fairing being in section, Figure 3 is a section horizontal through the fairing, the shock absorbing mechanism being removed, Figure 4 is a side elevation of the upper truss;

Figure 5 is a plan view of the upper truss,

Figure 6 is an end view of the upper truss,

Figure 7 is a plan view of the main upper cord support,

Figure 8 is a side elevation of the auxiliary upper cord support,

Figure 9 is an end view of the same,

Figure 10 is a side elevation of the auxiliary lower cord support,

Figure 11 is an end view thereof,

Figure 12 is a side elevation of a fairing hinge connection,

Figure 13 is a section through the hinge,

Figure 14 is a longitudinal section through the dash pot, and

Figure 15 is a section on the line 15—15 of Figure 14.

A tubular strut 10 has a threaded bushing 11 secured in the upper end thereof. A plug 12 screwed into this bushing is provided with an upstanding stem 13 which terminates in a ball 14 by which the strut is attached to the fuselage of an airplane. The plug 12 is also provided with a downwardly extending hollow and interiorly threaded boss 15 into which is screwed the threaded upper end of a piston rod 16. The piston rod, plug and tubular strut are formed with apertures, which are adapted to be brought into alignment for receiving a locking pin 17.

A tube 18 adapted to slide within the tubular strut 10 carries at its lower end the axle and landing wheels (not shown). The tubular strut 10 is of sufficient length to allow for the total vertical displacement of the landing wheels relative to the fuselage. A sleeve or cylinder 19 closed at one end is brazed, sweated or otherwise fastened inside of tube 18. The other end of the cylinder is closed by an apertured plug 20 in which the piston rod 16 is adapted to reciprocate, the plug 20 being properly recessed for receiving suitable packing and an adjusting nut 21. The piston rod carries a piston head 22, at its lower end, which is adapted to reciprocate in the cylinder 19. This cylinder contains oil and the wall thereof is formed with a tapering opening or bypass 23, so that when, as under the shock of landing, the piston 22 is moved downward relatively to the tube 18, oil will be forced from one side of the piston to the other through the opening or bypass 23 which becomes more and more restricted as the extent of such relative movement becomes greater. The resistance of the oil in passing through opening or slot 23 gradually absorbs the shock and exerts a cushioning effect in transmitting the impact of landing to the fuselage.

In order to provide an elastic cord shock absorber to cooperate with the dash pot arrangement above described, a truss 24 or girder in the form of an inverted channel having inclined sides 25 with their edges bent over to form flanges 26 is provided. The base or web 27 of the truss is apertured and flanged downwardly as indicated at 28 and 29. The tubular strut 10 extends through the annular flange 28 and passes through the truss 24 to which it is brazed or otherwise fastened at flange 28 and at the arcuate ends of flanges 26. Two tubular posts 30 are secured at their upper ends to the flanges 29 respectively. The tube 18 extends up into the truss 24 and the side plates 25 thereof are drilled to provide openings 31 whereby access may be had to screws 32 which are threaded into openings in the plug 20 communicating with passages 33 leading to the oil containing cylinder 19. By removing these oil filler hole screws 32, the supply of oil in the cylinder may be replenished.

An upper main cord support is in the form of tubular members 34, Fig. 7, having collars 35 brazed to their outer ends and a vertical tubular section 36 inserted between and secured to the inner ends thereof. This central vertical tubular section 36 is also brazed to the slidable tube 18, whereby the upper main cord support moves with the tube 18 and is guided in such movements by the collars 35 which engage the posts 30. Reinforcing webs 37 extend from collars 35 to the downwardly projecting end of the central tubular section 36. The tubular members 34 are preferably split at the bottom and formed with depending flanges which are riveted together as shown in Fig. 7, and comprise the web 37.

A lower main cord support is similar in construction to the upper support just described having end collars 35ª, tubular members 34ª, central tubular section 36ª and reinforcing web 37ª. The lower main cord support is arranged in inverted relation to the upper cord support, the web 37ª extending upwardly. In this case, however, the central tubular section 36ª is slidable with respect to tube 18 and the end collars 35ª are fixed in relation to the tubular posts 30, as will hereinafter appear.

An upper auxiliary cord support comprises a semi-cylindrical body 38 which is provided with a central opening 39 surrounded by a depending annular flange 40, having the tube 18 extending therethrough. The semi-cylindrical body 38 is formed with end flanges 41 having outwardly flared depending lower edges 42. These flanges are also formed with arcuate recesses 43 having laterally extending flanges 44 about them. The lateral flanges 44 are adapted to rest upon the tubular members 34 and support the body 38 in spaced relation thereto so that elastic cords may pass through the space so provided.

A lower auxiliary cord support consists of a semi-cylindrical body 45 having a central opening 46 and corresponding annular flange 47, and end apertures 48 associated with concentric annular flanges 49. The lower ends of the tubular posts 30 have inserted therein and secured thereto, cylindrical fittings 50 the bases of which are apertured and threaded as at 51. The collars 35ª of the lower main cord support embrace the fittings 50 which are smaller in diameter than the tubular posts and the upper edges of said collars preferably abut against the shoulders formed by the lower ends of said posts, and in this position are secured to said fittings. When the lower auxiliary cord support is in operative position, the central annular flange 47 slidably receives the tube 18, and bolts 52 having their stems passing through apertures 48 and engaging threads 51 hold the lower auxiliary support in said operative position, in which the body 45 is maintained in spaced relation to the tubular members 34ª so that elastic cords may pass through the space so provided. Elastic cords 53 are first wound about the tubular members 34, 34ª of the upper and lower main cord supports and then elastic cords 54 are wound upon the upper and lower auxiliary cord supports. This arrangement prevents wearing and chafing of the elastic cords on each other.

When the wheels of the landing gear of an airplane strike the ground, the tube 18 is restrained from downward movement by the reaction of the ground. However, the fuselage, tube 10, and the piston head 22 connected thereto, continue to travel in a vertical direction after the wheels of the landing gear have touched the ground. The tube 18 also carries truss 24, tubes 30 and lower main and auxiliary cord supports downward with it, so that the elastic cords 53, 54 are stretched, thus absorbing some of the landing shock. A large portion of this landing shock is absorbed by the oil dash pot as above described, the remainder being absorbed by the elastic cords. The cords then serve to return the fuselage and landing gear to their proper relative positions. Rapid rebound is prevented by the damping effect of the oil in returning to the proper side of the piston through the opening 23. The resistance to the return of the oil through this opening prevents the quick rebound common to the simple cord type of shock absorber. The dash pot action in conjunction with the elastic cords thus affords a greater cushioning effect than is present in the simple cord type of shock absorber, reduces the elongation and stress produced in the elastic cords which results in longer life for said cords and consequently less frequent changing.

A fairing of elliptical or stream-line shape is adapted to enclose the shock absorbing mechanism. This fairing includes a top plate 55 preferably of aluminum slanting downwardly and tapering outwardly from an opening therein surrounded by an annular bent-over end 56, reinforced by a wire 57. The forward portion of this plate is supported on the inclined flanges 26 of the truss 24. The elliptical body 58 of the fairing is connected to the top plate preferably by hinge plates 59, 60 secured respectively to the body and top plate and connected by a hinge rod 61. The hinge plates extend along the sides of the fairing which are substantially straight parallel surfaces. To the outside of the lower edge of the top plate about the remainder of its contour is secured a reinforcing strip 62 and a similar strip 63 is attached to the upper edge of the body so as to overlap the strip 62. In this manner these two parts of the fairing are held firmly together in such relation that they can be easily disassembled by withdrawing the hinge rods 61. A funnel shaped lower plate 64 secured to the lower edge of the body 58 tapers to an elliptical opening 65 of small dimension through which the tube 18 projects. A guide 66 of substantially the same contour as the opening 65 is inserted therein and secured to the lower plate 64. A housing 67 attached to the landing wheels or axle or a frame carrying the same (not shown) is adapted to telescope within the guide 66 so that the landing gear is effectively housed within a streamline fairing.

It will be understood that the particular construction described and shown has been chosen for illustrative purposes merely and that the invention as defined by the claims hereunto appended, may be otherwise embodied and applied without departing from the spirit and scope thereof.

We claim:

1. In a landing gear for aircraft, the combination of two telescopic frame members, a cylinder secured within the upper of said members and adapted to contain oil, said cylinder having a tapered oil space in the side wall thereof, a piston fixed in relation to the lower frame member and adapted to reciprocate in said cylinder, and elastic cord means for maintaining said cylinder and piston in normal position.

2. In a landing gear for aircraft, a tubular strut embodying telescopic members, a truss fixed to one of said members, posts carried by said truss, an upper elastic cord support attached to one of said members and slidable on said posts, a lower cord support fixed to said posts and slidable on one of said members, and elastic cords wrapped about said supports.

3. In a landing gear for aircraft, the combination of a tubular strut adapted to be fixed in relation to the fuselage, a tube adapted to be moved in telescopic relation to said strut by the shock incident to landing, a cylinder secured within said tube, said cylinder being adapted to contain a liquid, and having a tapered opening formed through the side wall thereof, a piston fixed in relation to said strut adapted to reciprocate in said cylinder, and elastic cord means for maintaining said piston and cylinder in normal position.

4. In a landing gear for aircraft, the combination of a tubular strut adapted to be attached to the fuselage, a tube adapted to be moved in telescopic relation to said strut by the shock incident to landing, a dash pot interposed between said strut and tube, a truss fixed to said tubular strut, posts attached to said struss, an upper cord support attached to said tube and slidably mounted on said posts, a lower cord support fixed to said posts and slidable relative to said tube, and elastic cords wound about said supports.

5. In a landing gear for aircraft, a tubular strut embodying two telescopic sections, a truss secured to one of said sections, guide posts carried by said truss, a lower cord support secured to said posts and slidable on the strut, an upper cord support slidable on said posts and fixed to a section of the strut, and elastic cord means wrapped around said cord supports.

6. In a shock absorber for the landing gear of aircraft, the combination of a movable main upper cord support, a main lower cord support fixed in relation to the fuselage, an auxiliary upper and an auxiliary lower cord support mounted respectively on said main upper and lower supports, and elastic cord means wound about said main and auxiliary supports.

In testimony whereof we affix our signatures.

ISAAC M. LADDON.
FREDRIC E. FLADER.